(12) United States Patent
Miyake et al.

(10) Patent No.: US 6,466,723 B2
(45) Date of Patent: Oct. 15, 2002

(54) CLEANING TOOL FOR OPTICAL FIBER CONNECTORS

(75) Inventors: Taisei Miyake; Ai Fukuhara, both of Musashino; Juichi Noda, Machida; Etsuji Sugita, Fussa; Hitoshi Goto; Isao Iwakane, both of Tokushima; Kou Niida, Yamato; Yuji Takaoka, Tokushima, all of (JP)

(73) Assignee: NTT Advanced Technology Corporation, Tokyo (JP)

( * ) Notice: Subject to any disclaimer, the term of this patent is extended or adjusted under 35 U.S.C. 154(b) by 0 days.

(21) Appl. No.: 09/795,082

(22) Filed: Mar. 1, 2001

(65) Prior Publication Data

US 2001/0033728 A1 Oct. 25, 2001

(30) Foreign Application Priority Data

Mar. 3, 2000 (JP) .......................................... 2000-058814

(51) Int. Cl.⁷ .............................. G02B 6/00; A47L 1/02
(52) U.S. Cl. .................... 385/134; 385/147; 15/97.1; 15/231; 15/268
(58) Field of Search ................. 385/134, 135, 385/147; 15/97.1, 101, 102, 103.5, 210.1, 220.4

(56) References Cited

U.S. PATENT DOCUMENTS

| | | | |
|---|---|---|---|
| 3,439,922 A | 4/1969 | Howard | |
| 3,647,990 A | 3/1972 | Eul, Jr. et al. | |
| 3,708,818 A * | 1/1973 | Hotz | ............................... 15/97 |
| 3,761,984 A | 10/1973 | Hauschild et al. | |
| 4,004,314 A | 1/1977 | Post et al. | |
| 4,354,292 A | 10/1982 | Telestad et al. | |
| 4,462,056 A | 7/1984 | Kara | |
| 4,614,270 A | 9/1986 | Oishi | |
| 4,638,393 A | 1/1987 | Oishi et al. | |
| 4,645,295 A | 2/1987 | Pronovost | |
| 4,750,804 A | 6/1988 | Osaka et al. | |
| 4,792,876 A | 12/1988 | Cook et al. | |
| 4,953,929 A | 9/1990 | Basista et al. | |
| 5,117,528 A * | 6/1992 | Kanayama et al. | ............ 15/210 |
| 5,220,703 A * | 6/1993 | Kanayama et al. | ......... 15/210.1 |
| 5,735,013 A * | 4/1998 | Yaguchi et al. | ............. 15/210.1 |
| 5,768,738 A | 6/1998 | Lee | ............. 15/210.1 |
| 5,836,031 A | 11/1998 | Cox | ...................... 15/104.002 |
| 6,209,162 B1 * | 4/2001 | Clairadin et al. | ............. 15/97.1 |
| 6,209,163 B1 * | 4/2001 | Clairadin et al. | ............. 15/97.1 |
| 6,309,278 B1 * | 10/2001 | Suzuki et al. | .................. 451/41 |

FOREIGN PATENT DOCUMENTS

| | | | |
|---|---|---|---|
| EP | 0 391 111 | 10/1990 | ................ 15/210.1 |
| JP | 59-145720 | 9/1984 | |
| JP | 2-264907 | 10/1990 | |
| JP | 3-45279 | 4/1991 | |
| JP | 6-68011 | 9/1994 | |
| JP | 6-242347 | 9/1994 | |
| JP | 2539020 | 7/1996 | |

* cited by examiner

*Primary Examiner*—Brian Healy
*Assistant Examiner*—Kevin S. Wood
(74) *Attorney, Agent, or Firm*—Wenderoth, Lind & Ponack, P.L.L.P.

(57) ABSTRACT

A cleaning tool for cleaning optical fiber connectors exposes a cleaning sheet in a window of the case. A winding pulley is operable to wind the cleaning sheet upon rotation at a constant pitch. A rotation mechanism, that is operated by a lever, rotates the winding pulley. The case is constructed of a first front plate and a second front plate which are closed off by a perimeter wall along their outer circumference. The case has an open portion in a part of the perimeter wall, and the lever is disposed in the open portion in an inclined orientation.

29 Claims, 8 Drawing Sheets

CLEANING TOOL FOR OPTICAL FIBER CONNECTORS

This application is based on application No. 058814 filed in Japan on Mar. 3, 2000, the content of which is incorporated hereinto by reference.

BACKGROUND OF THE INVENTION

This invention relates to a cleaning tool for removing dirt and foreign material from optical fiber connectors to make them clean.

An optical fiber connector has a connecting surface exposed at its end. The optical fiber connector 41 shown in FIG. 1 has optical fiber fixed at the center of a zirconia ceramic ferrule 42, and its connecting surface 43 is polished to a mirror surface. Optical fiber connectors of this configuration are joined with connecting surfaces in mutual opposition to transmit optical signals. If the connecting surfaces are dirty or foreign material is attached to the connecting surfaces when a pair of optical fiber connectors are joined, optical signals cannot be transmitted properly. This is because a dirty surface or foreign particles will block or reflect light in the optical fiber.

To avoid this problem it is necessary to clean the connecting surfaces then join optical fiber connectors. The cleaning tool shown in FIG. 2 has been developed as a tool for cleaning optical fiber connectors (Japanese Laid-open Patent Publication TOKU-KAI-HEI 6-242,347, 1994). FIG. 3 shows the internal structure of the cleaning tool of FIG. 2 with the case 44 opened. As shown in FIG. 3, a cleaning sheet 4 is wound around pulley 47 in the form of tape inside the case 44. Cleaning sheet 4 is wound by operation of a lever 45 provided on the case 44, and it moves cleaning sheet 4 which is exposed in windows 46 through the case 44. Each time the lever 45 is operated, an unused portion of the cleaning sheet 4 is exposed in the windows 46. Therefore, an optical fiber connector connecting surface can be polished clean by rubbing the connecting surface against the cleaning sheet 4 that is exposed through the windows 46.

The cleaning tool shown in FIG. 2 is capable of cleaning optical fiber connecting surfaces with the cleaning sheet, but it limits operator's hands to use it. The cleaning tool shown in FIG. 2 is arranged for use by operating the lever with the operator's left hand thumb so that right-handers can use it. The structure of the cleaning tool is not capable of being operated by right hand for left-handers. It is a drawback that makes it difficult to use the tool by left-handers.

In addition, the cleaning tool shown FIG. 2 has another drawback in that the projecting lever from the case makes a storage outer case larger. Further, the cleaning tool shown in FIG. 2 has another drawback in that dirt and dust can enter into the case and then attach to the cleaning sheet, since the cleaning tool shown in FIG. 2 has an open circular arc shaped slit to permit rotation of the lever. If dirt attaches to the cleaning sheet, it can attach to a connecting surface when the optical fiber connector is rubbed against the cleaning sheet, and disrupt light transmission. In particular, dirt does not attach to the portion of the cleaning sheet which is wound tightly in a roll, but a portion of the cleaning sheet is unwound and exposed within the case for the purpose of transfer and delivery.

The present invention has been developed to further solve these types of problems and drawbacks. Thus, it is a primary object of the present invention to provide a cleaning tool for optical fiber connectors, which can be used by every operator conveniently, can be held compactly and has a structure that can prevent dirt and dust from entering into the case.

The above and further objects and features of the invention will more fully be apparent from the following detailed description along accompanying drawings.

SUMMARY OF THE INVENTION

The cleaning tool for optical fiber connectors of the present invention has a case formed in a box shape which exposes a part of a cleaning sheet disposed inside in a window for cleaning, a winding pulley for winding the cleaning sheet disposed inside of the case at a constant pitch, a rotating mechanism for rotating the winding pulley, and a lever for operating the rotating mechanism. Further, the cleaning tool of the present invention has the elements described below.

The case has a box-like form that is defined by a first front (side) plate and a second front (side) plate interconnected by a perimeter wall. The cleaning sheet and the winding pulley are disposed between the first front plate and the second front plate of the case. The case defines an open portion partially in the perimeter wall, and the lever is disposed in the open portion so as to be inclinable. The lever is attached to the case to be able to incline (pivot) about an incline axis perpendicular to the surfaces of the first front plate and the second front plate. Operating the lever rotates the winding pulley by the rotating mechanism, and winding the cleaning sheet of the winding pulley moves the cleaning sheet in the cleaning window.

The cleaning tool for optical fiber connectors described above has the advantageous feature that it can be used by every operator conveniently, regardless of whether they are right-handed or left-handed. The operators can hold the upper surface, which as the cleaning window, with their thumbs, and the bottom side with the other fingers. The case of the cleaning tool of the present invention, which is held in such manner for use, can be held either by the right hand or the left hand for use. In particular, the cleaning tool of the present invention has the feature that it can be used easily in comparison with the related art cleaning tool, since it is operated by holding the upper surface with the operator's thumb and holding the lever with the other fingers, and not by holding the lever with operator's thumb such as in the related art cleaning tool.

In addition, the cleaning tool for optical fiber connectors, as described above, has a further advantageous feature in that its overall width can be substantially the same as the case width, and it can be held in a more compact storage case or the like, since it is not necessary for the lever to project from the side of the case, as in the prior art cleaning tool, and the lever is disposed in the open window on the perimeter wall so as to be able to pivot.

Further, the cleaning tool for optical fiber connectors described above has the feature that it has the structure for closing off the open window in the perimeter wall by operation of the lever and thereby decreasing the dirt and dust that can enter into the case.

DETAILED DESCRIPTION OF THE INVENTION

Figure 1:
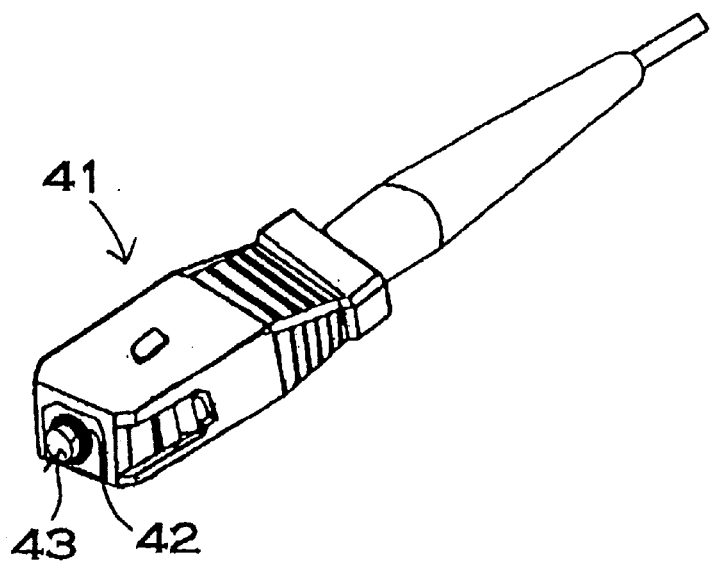
FIG. 1 is a perspective view showing an optical fiber connector.
Figure 2:
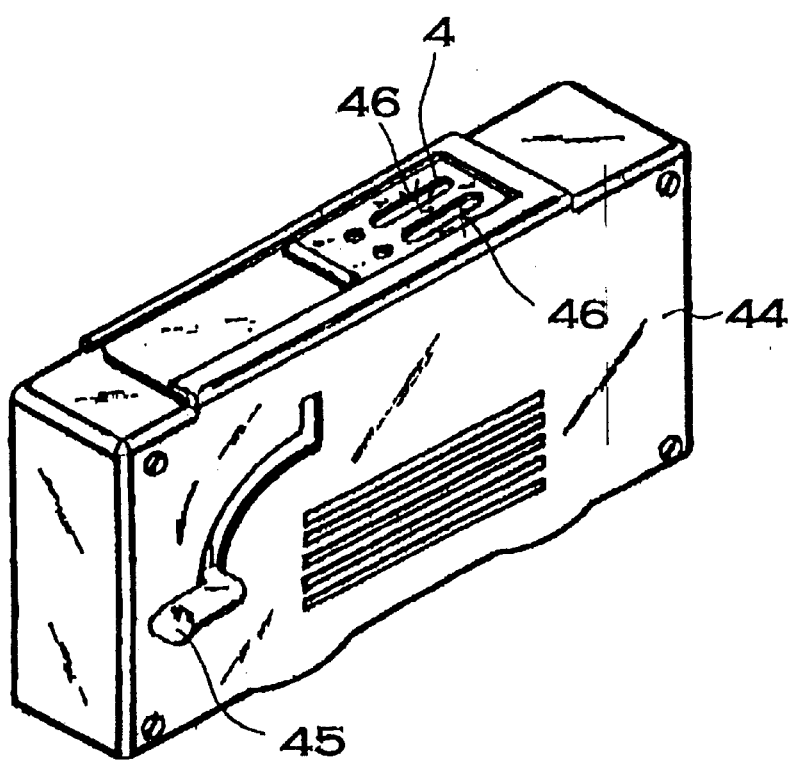
FIG. 2 is a perspective view showing a related art cleaning tool for optical fiber connectors.
Figure 3:
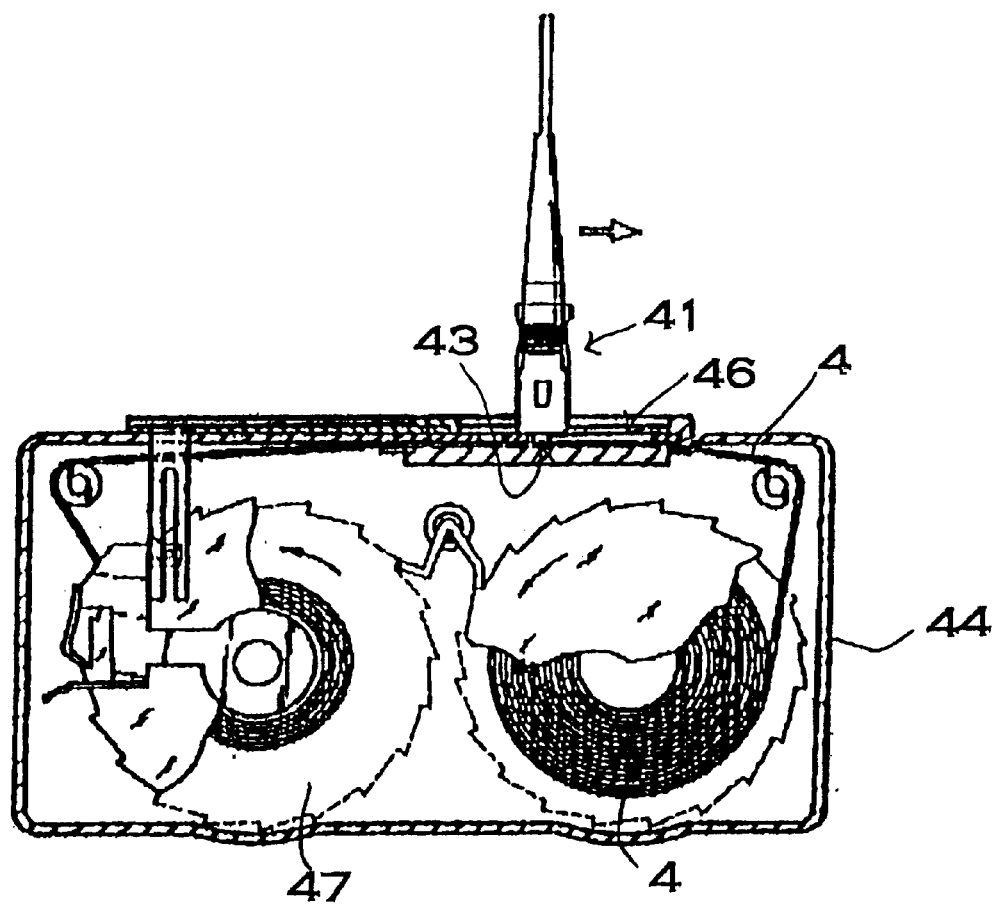
FIG. 3 is a front sectional view showing the interior of the cleaning tool for optical fiber connectors of FIG. 2.
Figure 4:
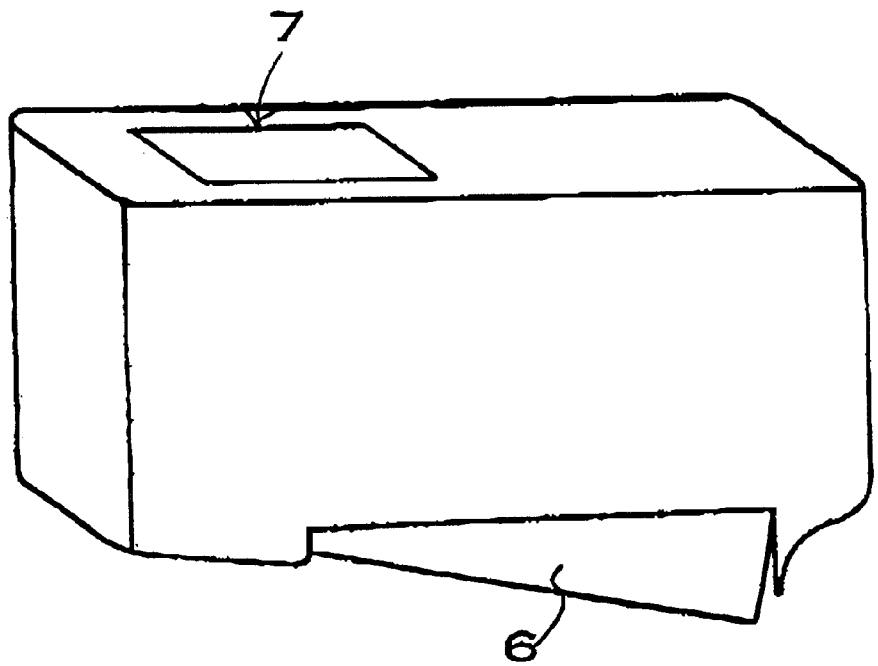
FIG. 4 is a perspective view showing an embodiment of a cleaning tool for optical fiber connectors constructed in accordance with the present invention.
Figure 5:
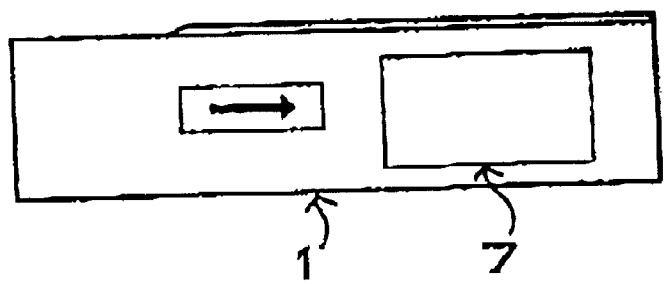
FIG. 5 is a plan view of the cleaning tool for optical fiber connectors shown in FIG. 4.
Figure 6:
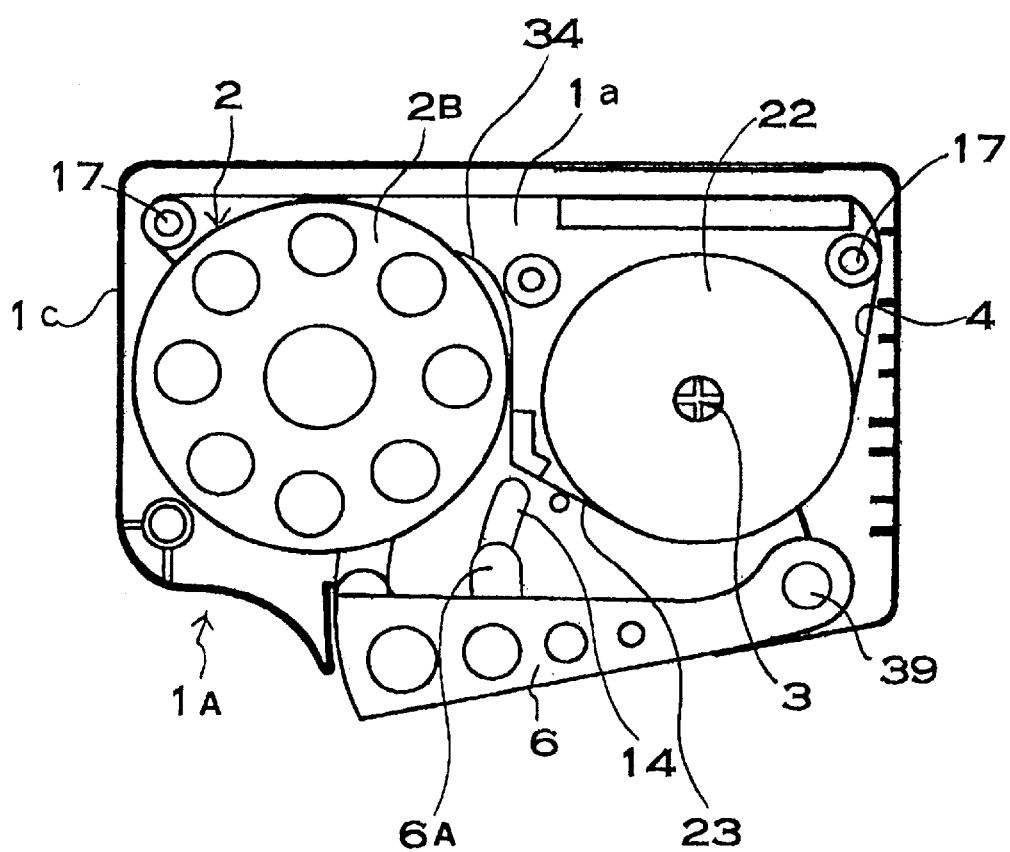
FIG. 6 is a front view of the cleaning tool for optical fiber connectors shown in FIG. 4 with the case opened.

The cleaning tool for optical fiber connectors is shown in the perspective view of FIG. 4, the plan view of FIG. 5 and the front view of FIG. 6 with the case 1 opened. The cleaning tool has a case 1, a winding pulley 2 for winding a cleaning sheet 4 attached inside of the case 1 in a constant pitch, a rotating mechanism 5 for rotating the winding pulley 2 and a lever 6 for operating the rotating mechanism 5.

The case 1 is a box shaped case formed with a first front plate 1a and a second front plate 1b, whose outline is closed off by a perimeter wall 1c. The cleaning sheet 4 and the winding pulley 2 are disposed between the first front plate 1a and the second front plate 1b in the case 1. The overall form of the cleaning tool shown in these figures is formed in an approximately rectangular shape. The lever 6 is positioned so as to be able to incline in an open portion in the perimeter wall 1c that is located in a lower surface as shown in FIG. 6. In addition, the case 1 has a cleaning window 7 that is located in an upper surface of the case as shown in FIG. 6 to partially expose the cleaning sheet 4.

Figure 7:
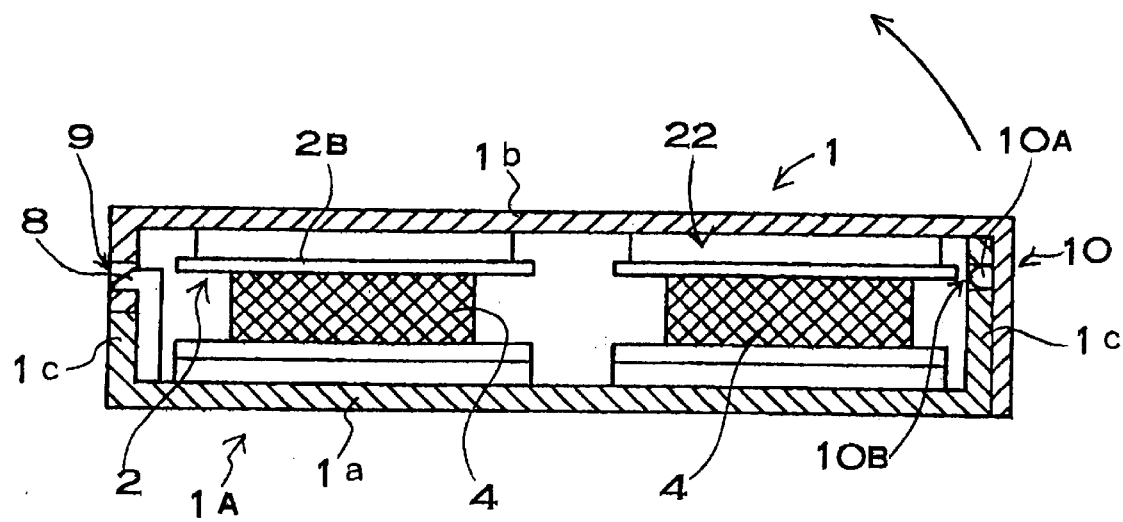
FIG. 7 is a cross sectional view of the cleaning tool shown in FIG. 4 with the case in an open-close status.

The case 1 has a structure that can open for the purpose of exchanging the cleaning sheet 4. A main case 1A is provided with the first front plate 1a formed integrally with the perimeter wall 1c. The case 1 includes the main case 1A and the second front plate 1b that joins to the main case 1A removably. FIG. 7 shows the structure that can join the second front plate 1b with the main case 1A removably. In the case 1, as shown in FIG. 7, a plurality of hinge hooks 8 are disposed with predetermined pitch and are formed integrally with the main case 1A. Retaining holes 9 that guide the hinge hooks 8 are formed through a lower sidewall of the second front plate 1b. In addition, male and female stoppers 10 are disposed on the opposite sidewall of the second front plate 1b. The stoppers 10 shown in FIG. 7, include the male stopper 10A projecting from the sidewall of the second front plate 1b, and the female stopper 10B for retaining the male stopper 10A are disposed on the perimeter wall 1c of the main case 1A.

The case 1 with this structure can be opened by releasing the male and female stoppers 10, then inclining the second front plate 1b in the direction shown by the arrow in FIG. 7 until the main case 1A is opened. Also, the second front plate 1b is detachable from the main case 1A by releasing the retaining holes 9 from the hinge hooks 8.

Figure 8:
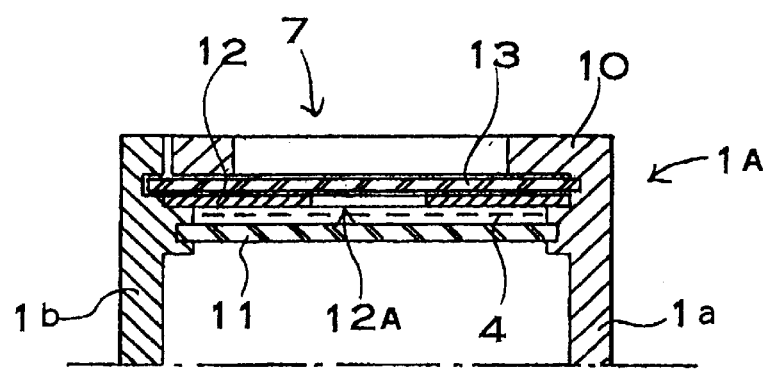
FIG. 8 is a cross sectional view of a cleaning window of the cleaning tool shown in FIG. 4.

The cleaning window 7 is disposed in the perimeter wall 1c in a rectangular form. As shown, the cross sectional view of FIG. 8, a holding plate 11 for holding the back of the cleaning sheet 4 is disposed inside of the cleaning window 7. In addition, an intermediate window sheet 12 and a shutter 13 are disposed in the front side of the cleaning sheet 4. The holding plate 11 is disposed horizontally inside of window 7, with opposite edges thereof inserted in insertion grooves formed in the first front plate 1a and the second front plate 1b. The holding plate 11 is larger than the open area of the window 7, and completely closes off the window 7.

The intermediate window sheet 12 is disposed horizontally in the front or outward side of the holding plate 11. The intermediate window sheet 12 is also disposed with its opposite edges inserted in the insertion grooves of the first front plate 1a and the second front plate 1b. The intermediate window sheet 12 has an open window 12A at its center. A passing space is formed between the intermediate window sheet 12 and the holding plate 11 to permit the cleaning sheet 4 to pass therethrough. The cleaning sheet 4 is exposed through the open window 12A of intermediate window sheet 12, so that the optical fiber connector can be cleaned at this location. The open window 12A is shaped in the form of rectangle, which extends along with feeding direction of the cleaning sheet 4. The open window 12A has sufficient width and length to permit cleaning of the edges of the optical fiber connectors that are guided there and fed toward its longitudinal direction.

The shutter 13 closes the cleaning window 7 when the cleaning tool is not in use. When the cleaning tool is in use, i.e., when cleaning optical fiber connectors, it opens by operating the lever 6. As shown the cross sectional view in FIG. 8, the edges of shutter 13 are guided by guide grooves formed on the inner surface of the first front plate 1a and the second front plate 1b to permit the shutter to be slidably moved along the inner surface of the perimeter wall 1c to open and close the cleaning window 7.

In addition, the rotating mechanism 5 moves the shutter 13 in response to the operation of the lever 6. To achieve this, as shown in the front view of FIG. 9, the shutter 13 is connected to a slit arm 15 having a slit 15A for receiving a crankpin 16 of the rotating mechanism 5. The slit arm 15 forms the slit 15A, which is extended in the direction traversing the shutter 13 opening direction, since the shutter 13 is opened and closed horizontally in FIG. 9, so that the slit 15A is extended vertically. The shutter 13 is bent at one end of a metal sheet, and forms the slit arm 15.

Figure 9:
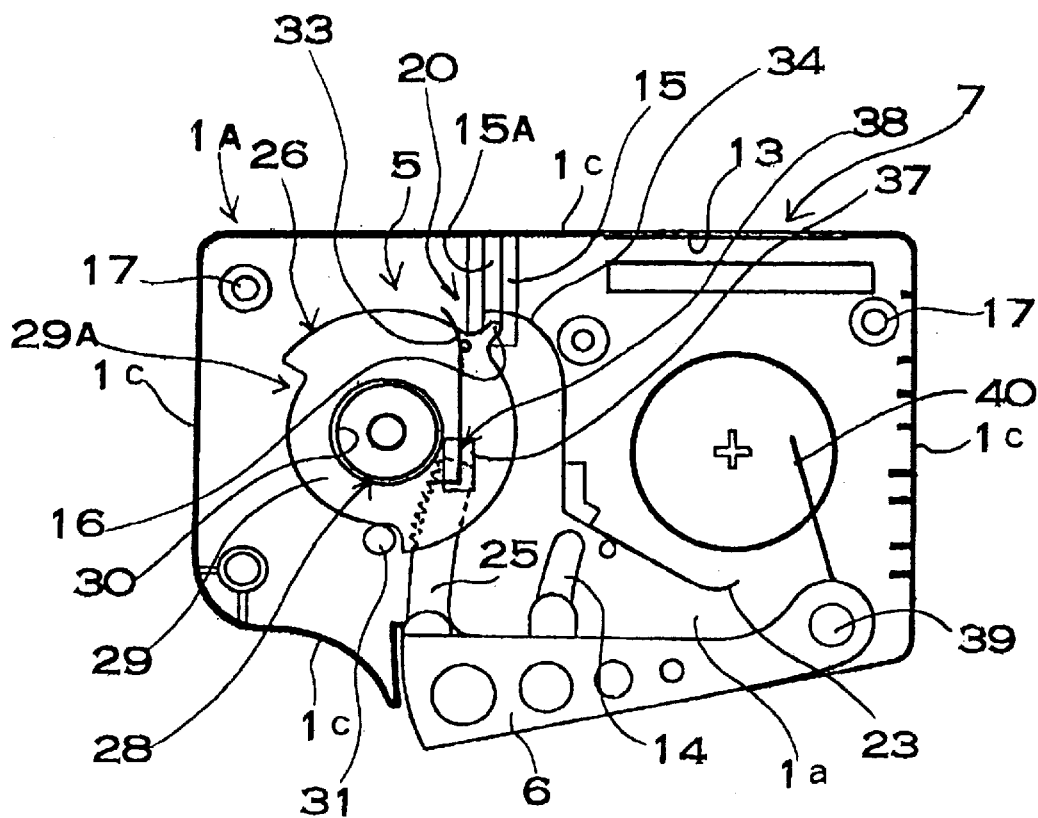
FIG. 9 is a front view of the cleaning tool shown in FIG. 4 with the case opened and the ratchet pulley removed.

Further, the case 1 shown in FIG. 9 has a idle roller 17 connected with the inner surface of the first front plate 1a for guiding the cleaning sheet 4 into a predetermined position.

Figure 10:
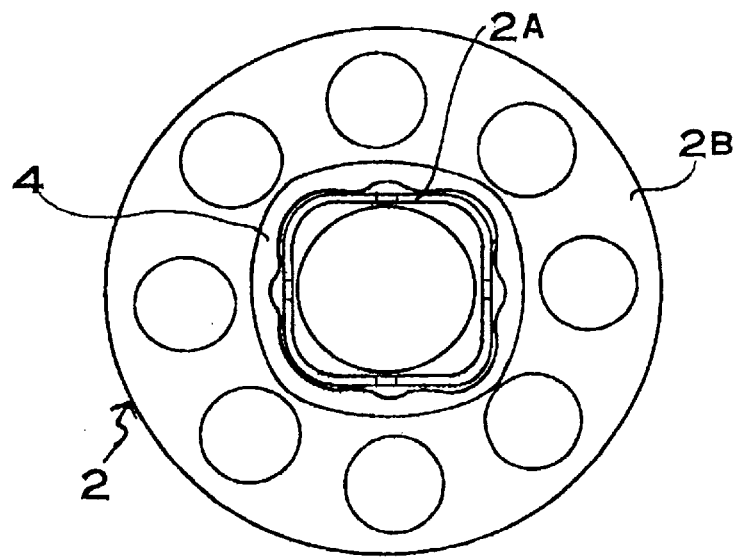
FIG. 10 is a bottom view of the winding pulley.
Figure 11:
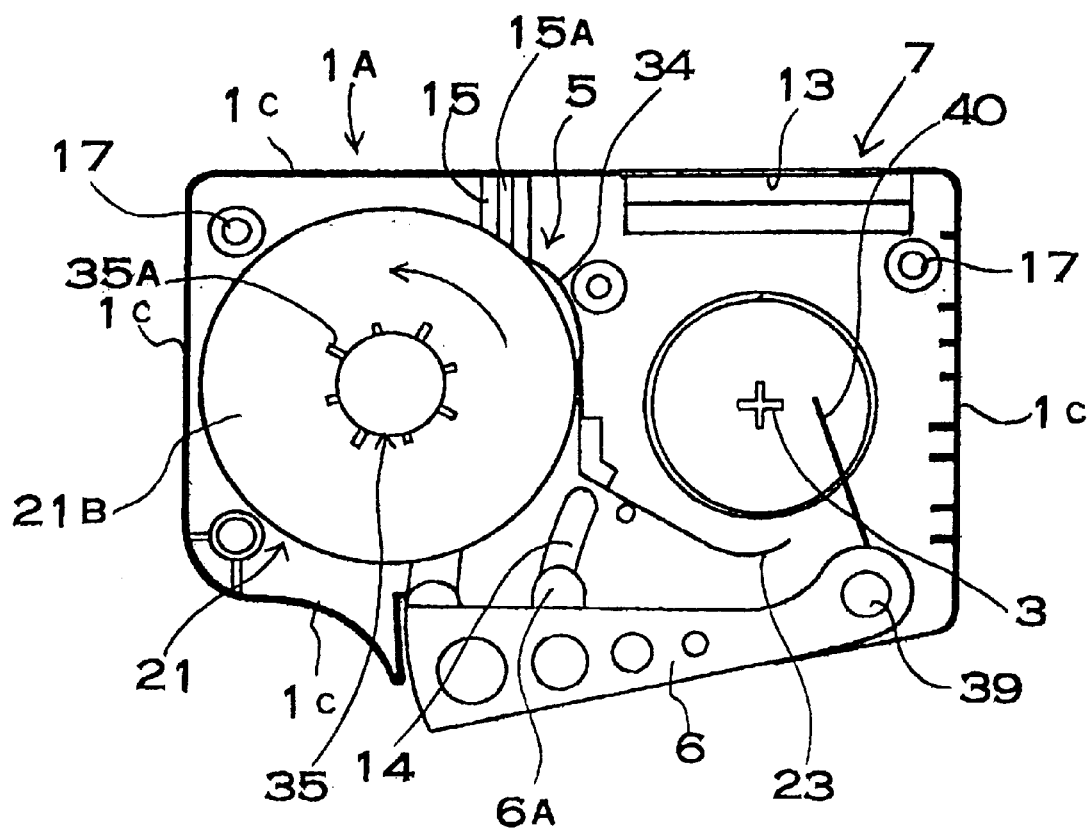
FIG. 11 is a plan view of the cleaning tool shown in FIG. 4 with the case opened and the ratchet pulley removed.

Rotating mechanism 5 rotates the winding pulley 2 in one direction. The winding pulley is made of plastics. The winding pulley 2 of FIG. 10 is formed integrally with slit axis 2A and a disciform outer plate 2B. The slit axis 2A has a plurality of row of slits extended in direction of the axis. The winding pulley 2 is connected to a ratchet pulley 21 of ratchet mechanism 20 shown in FIG. 11 so as to not rotate freely. Projections 35A of a spline axis 35 of ratchet pulley 21 are guided into the slits of the slit axis 2A, and then the winding pulley 2 is connected with the ratchet pulley 21 so as to not rotate freely. The winding pulley 2 attached to the ratchet pulley 21 winds the cleaning sheet 4 between the disciform outer plate 2B and a disc 21B of the ratchet pulley 21.

The rotating mechanism 5 rotates the winding pulley 2 of this structure to wind the cleaning sheet 4 due to the attachment to the ratchet pulley 21. In addition, the winding pulley 2 is removable from the ratchet pulley 21, after it winds up the cleaning sheet 4. It has the feature that the cleaning sheet 4 wound around the winding pulley 2, after having been used up, can be thrown away easily by removing winding pulley 2 from the ratchet pulley 21. The winding pulley of this structure has the outer plate 2B in only one side of the slit axis 2A so that the cleaning sheet wound thereon can be easily removed along the slit axis 2A. In contrast with the related art cleaning tool, since the winding pulley has the outer plates on both sides, the cleaning sheet wound thereon cannot be easily removed from the winding pulley, so that the winding pulley with the cleaning sheet wound thereon after use is thrown away. Accordingly, as shown in FIG. 10, since the recyclable winding pulley 2 can be separately removed to permit only the cleaning sheet to be thrown away, it has the features of low manufacturing costs and significantly reduced waste.

The case 1 has a feeding axis 3 formed integrally on the first front plate 1a made of plastic to set the cleaning sheet 4 at the predetermined position. The feeding axis 3 is formed as a cross-shaped column. The cleaning sheet 4 is attached to the feeding axis 3 directly or via the feeding pulley so as to rotate the cleaning sheet 4. The cleaning sheet attached to the feeding axis 3 via a feeding pulley with the structure attaching the feeding pulley so as to prevent reverse rotation has the feature that it prevents the cleaning sheet 4 from sagging.

Figure 12:
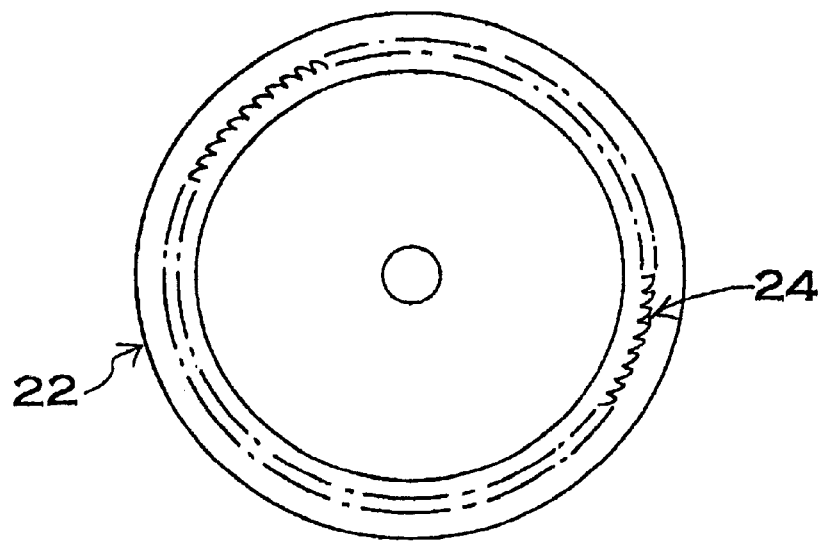
FIG. 12 is a bottom view of the feeding pulley.

A reverse motion preventing arm 23, which is connected to the first front plate 1a, prevents reverse rotation of the feeding pulley 22. As shown in FIG. 12, the feeding pulley 22 has a reverse rotation preventing gear 24 disposed on the surface, back of the disc 2B, facing the first front surface 1c. It prevents the feeding pulley 22 from moving in a reverse direction by engaging the reverse preventing gear 24 with the end of the reverse preventing arm 23.

The rotating mechanism 5 has a rack 25 that is connected to lever 6 and can be moved in reciprocation by operation of the lever 6. A back-and-forth rotating plate 26 has a gear to bite the rack 25 and the ratchet equipment 20 rotating the winding pulley 2 in the fixed rotation by rotating of the back-and-forth rotating plate 26.

Figure 13:
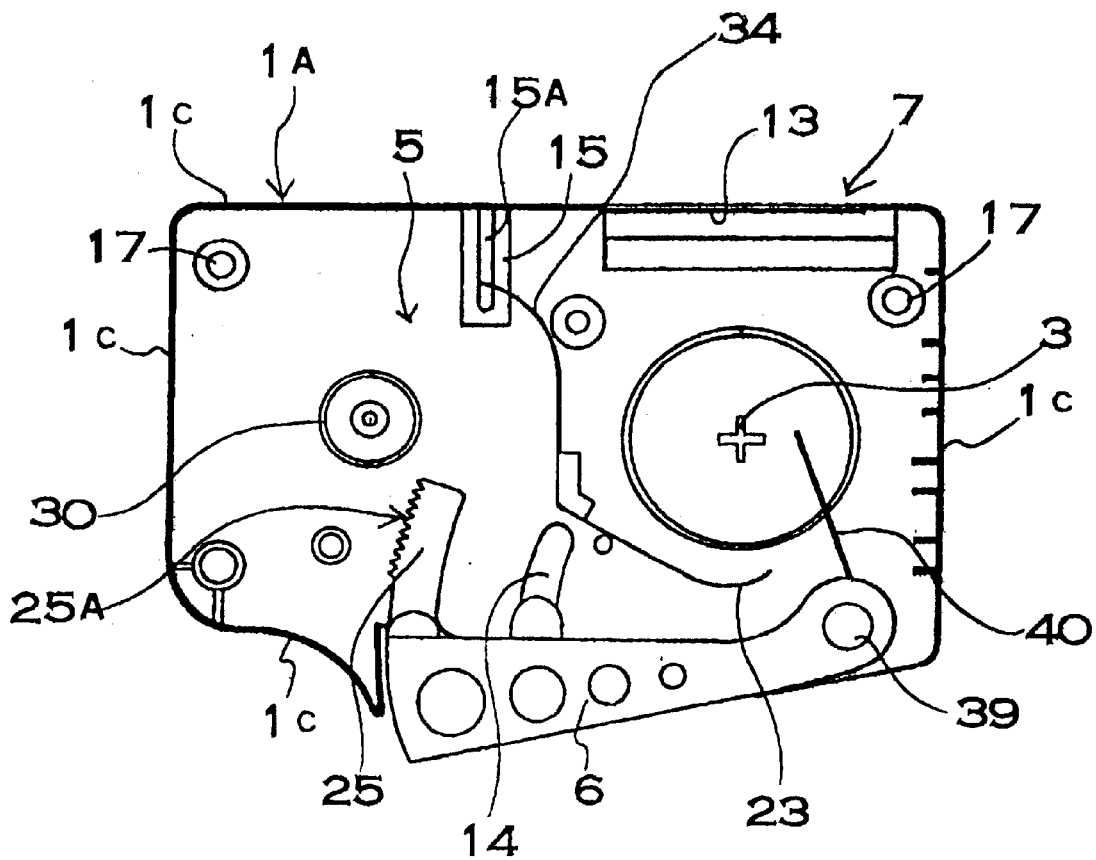
FIG. 13 is a plan view of the cleaning tool shown in FIG. 4 with a back-and-forth rotating pulley removed.

The rack 25 can be integrally formed of plastic with lever 6. The rack is connected to the end of the lever 6, which is opposite relative to an incline axis 39. As shown in FIG. 13 with the back-and-forth rotating plate 26 removed, the rack 25 is formed so as to move along the surface of the first front plate 1a. The rack 25 has a circular arc shaped gear 25A. An arc of the rack 25 is trace of the lever 6 about the incline axis 39. It causes the rack 25 and a pinion 28 to engage each other when the lever 6 is rotated.

The back-and-forth rotating plate 26 is made of plastic and formed integrally with a disc plate 29 and the pinion 28. The disc plate 29 has a pierced hole in its center. A round rib 30 formed integrally with the first front plate 1a is inserted into the pierced hole so as to rotatably connect the first front plate 1a with the back-and-forth rotating plate 26.

In addition, the disc plate 29 has a crankpin 16 to open and close the shutter 13 and a circular arc shaped notch 29A on its outer circumference. The circular arc shaped notch 29A guides a positioning projection 31, which projects from the first front plate 1a. The positioning projection 31 is guided along the circular arc shaped notch 29A so as to limit the rotating range of the back-and-forth movement. The back-and-forth rotating plate 26 of FIG. 9 has the pinion 28 and crankpin 16 projecting from the back side of the disc plate 29.

The ratchet equipment 20 includes the ratchet pulley 21 for attaching the winding pulley 3, an elastic rotating arm 33 for rotating the ratchet pulley 21 in one direction and a stopper arm 34 for preventing the ratchet pulley 21 from rotating in the reverse direction. The elastic rotating arm 33 and the stopper arm 34 are made of elastic metal or hard plastic that can deform elastically.

Figure 14:
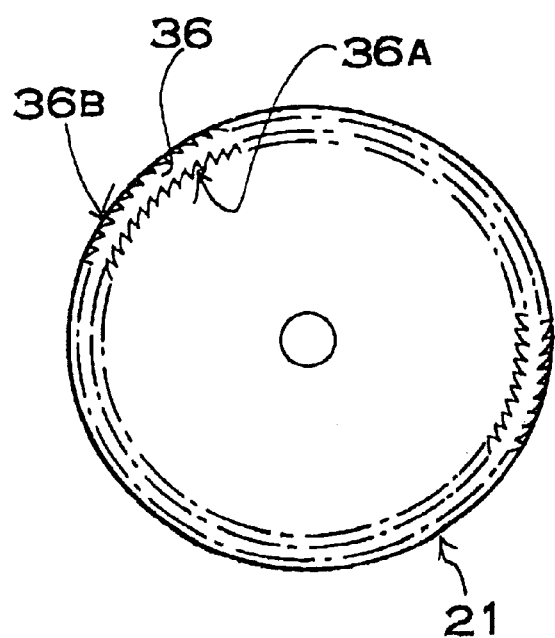
FIG. 14 is a bottom view of the ratchet pulley of the cleaning tool shown in FIG. 4.

The ratchet pulley 21 is integrally formed of plastic material. The ratchet pulley 21 has a spline axis 35 for attaching the winding pulley 2 on the upper surface of the disc 21B as shown in the plan view of FIG. 11, and a ratchet ring 36 with ratchet gear formed on both the inside and outside of a lower surface as shown in FIG. 14. The spline axis 35 is inserted into the slit axis 2A of winding pulley 2. The spline axis 35, which is connected to the slit of the slit axis 2A, is disposed so as to extend along a direction of the axis, and the spline axis 35 is connected to the slit axis 2A so as to not rotate.

The end of elastic rotating arm 33 is connected to the inner ratchet gear 36A of the ratchet ring 36. The end of stopper arm 34 joins to the outer ratchet gear 36B. The ratchet ring 36 forms the inner ratchet gear 36A is sloped so that the inner ratchet gear 36A pushes the elastic rotating arm 33 in the direction shown by the arrow in FIG. 11 then the inner ratchet gear 36A rotates the ratchet pulley 21, and elastic rotating arm 33 is released from its retaining engagement and it moves on the surface of the ratchet gear 36A. In addition, the outer ratchet gear 36B is formed with slope on its back to catch the end of the stopper arm 34 such that the ratchet pulley 21 can rotate in the direction of the shown arrow while reverse rotation prevented.

As shown in FIG. 9, one end of the elastic rotating arm 33 is connected to the back-and-forth rotating plate 26 such that its top end is connected to the inner ratchet gear 36A of ratchet ring 36 disposed on the ratchet pulley 21. The top end of the elastic rotating arm 33 is curved relative to the direction of the rotation of the inner ratchet gear 36A. It ensures the ratchet pulley 21 will properly prevent rotation in a wrong direction. The elastic rotating arm 33 of FIG. 9 has a bent portion formed in an L-shape at the bottom end thereof, and the bent portion is secured on the upper surface of the disc plate 29 of the back-and-forth rotating plate 26. The disc plate 29 has a retraining rib 37 projecting from the upper surface to connect with the elastic rotating arm 33. The retraining rib 37 forms an L-shaped groove for receiving the bent portion of the elastic arm 33, and the L-shaped groove joins to the bent portion of the elastic arm 33.

As shown in FIG. 9, the top end of the stopper 34 is curved toward the direction of rotation of the ratchet pulley 21. It permits rotation of the ratchet pulley 21 in the proper direction smoothly and to prevent from reverse rotation. The stopper arm 34 of FIG. 9 is formed integrally with the reverse rotation preventing arm 23 for preventing the feeding pulley 2, which is attached to the feeding axis 3, from reversing. The middle of the stopper arm 34 and the reverse preventing arm 23 are fixed on the first front plate 1a. The reverse rotation preventing arm 23 is extended to the position to retain the reverse preventing gear 24, which is disposed on the back of the feeding pulley 22, and the top end of the reverse preventing arm 23 is curved in the direction of rotation of the feeding pulley 22.

The perimeter wall 1c of the case 1 defines an open portion in a lower part of the case as shown in FIG. 6 and FIG. 9. The lever 6 is disposed at the open portion so as to be able to incline. The lever 6 is attached to the case 1 so as to be able to move about the incline axis 39, which is orthogonal to the surfaces of the first front plate 1a and the second front plate 1b, the incline axis 39 is perpendicular to surface of the sheet in FIG. 9. The incline axis 39 is disposed at the corner of the case 1 and formed integrally with the case 1. An axis hole is provided in the lever 6, the incline axis 39 is inserted in the axis hole, and the lever 6 is attached to the incline axis 39 with a screw.

The lever 6 is biased in a direction so as to project from the open portion by an elastic part 40 when the lever 6 is not operated by a user's hand. The loop portion of the middle of the elastic part 40 is received on the incline axis 39. The elastic part 40 is a metal leaf spring whose one end is connected to the first front plate 1a and the other end joins to the lever 6. The elastic part can be anything that thrusts the lever 6 in the thrusting direction.

The lever 6 has a projection 6A projecting toward the first front plate 1a side to limit of inclination angle. The first front plate 1a has a circular arc shaped guiding groove 14 to guide projection 6A. The projection 6A can touch both ends of the guiding groove 14, and thus the inclination angle of the lever 6 can be limited.

The cleaning tool for optical fiber connectors described above is used to clean the optical fiber connector in the manner described below;

1. The second front plate 1b of the case 1 is opened, the feeding pulley 22 is set on the feeding axis 3, and then the cleaning sheet 4 is set on the feeding pulley 22.

2. The cleaning sheet 4 is pulled from the feeding pulley 22, placed onto an idle roller 17, then passed it between the shutter 13 and the holding plate 11, and then the end of the cleaning sheet 4 is connected to the winding pulley.

3. The case 1 is closed with the second front plate 1b.

4. The lever 6 is pressed, and then the lever rotates the back-and-forth rotating plate 26 via the rack 25. The back-and-forth rotating plate 26 rotates the ratchet pulley 21 via the elastic rotating arm 33, and rotates the winding pulley 2 attached to the ratchet pulley 21. Therefore, the winding pulley 2 winds the cleaning sheet 4 by a constant length. When pulling out the cleaning sheet 4, the feeding pulley 22 rotates in a direction to feed the cleaning sheet 4.

5. The back-and-forth rotating plate 26 upon rotation opens the shutter 13 via crankpin 16. At this time, the crankpin 16 of the back-and-forth rotating plate 26 slides in the slit of the slit arm 15, pulls the shutter 13 toward the rotating direction via slit arm 15 and opens the cleaning window 7. Then the optical fiber connectors are cleaned by the cleaning sheet 4 which is exposed in the cleaning window 7.

6. After cleaning the optical fiber connector, the lever 6 is released, and then the elastic part 40 pushes the lever 6 back to the original position. At this time, the rack 25 connected to the lever 6 moves in the opposite direction of pressing the lever 6, and reverses the back-and-forth rotating plate 26.

7. The back-and-forth rotating plate 26, in reverse rotation, moves the elastic rotating arm 33, which is connected to the back-and-forth rotating plate 26, along the surface of the inner ratchet gear 36A of the ratchet pulley 21. The ratchet pulley 21 engages the end of the stopper arm 34 to prevent rotation.

At this time, the crankpin 16 of the back-and-forth rotating plate 26 moves in the slit of the slit arm 15, and moves the shutter 13 in a direction to close the case opening.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or the equivalence of such metes and bounds thereof are therefore intended to be embraced by the claims.

What is claimed is:

1. A cleaning tool for cleaning optical fiber connectors, the cleaning tool comprising:
    a case formed in a box shape and including a first side plate, a second side plate, and a perimeter wall interconnecting the first and second side plates;
    a cleaning sheet retained inside of the case, wherein the case has a cleaning window located in the perimeter wall for exposing a portion of the cleaning sheet;
    a winding pulley for winding the cleaning sheet at a constant pitch, the winding pulley being disposed between the first side plate and the second side plate;
    a rotating mechanism for rotating the winding pulley; and
    a lever connected to the rotating mechanism, the lever being disposed in an open portion formed in the perimeter wall of the case and attached to the case so as to be able to pivot about an incline axis that is perpendicular to interior surfaces of the first and second side plates,
    wherein pivotal movement of the lever operates the rotating mechanism, which rotates the winding pulley to move the cleaning sheet in the cleaning window, and
    wherein the open portion receives the lever in an inclined position and the open portion is positioned at an opposite side of the case relative to the cleaning window.

2. The cleaning tool as claimed in claim 1, wherein the first and second side plates are oblong in shape, and the open portion for receiving the lever is located in one of the longer sides of the perimeter wall.

3. The cleaning tool as claimed in claim 2, wherein the incline axis is located in a corner area of the case.

4. The cleaning tool as claimed in claim 1, wherein the case can be opened to permit replacement of the cleaning sheet.

5. The cleaning tool as claimed in claim 4, Wherein the first side wall is integrally formed with the perimeter wall so as to define a main case component, and the second side plate is detachably connected to the main case component.

6. The cleaning tool as claimed in claim 5, wherein the main case component has a plurality of hinge hooks, and the second side plate defines a plurality of retaining holes for receiving the hinge hooks, respectively.

7. The cleaning tool as claimed in claim 5, wherein the case includes stoppers comprising at least one male stopper projecting from a side surface of the second side plate and a female stopper provided in the perimeter wall of the main case component for receiving the male stopper.

8. The cleaning tool as claimed in claim 1, further comprising a holding plate, disposed in the cleaning window, for supporting an interior side of the cleaning tape.

9. The cleaning tool as claimed in claim 8, further comprising an intermediate window sheet disposed in the cleaning window and positioned outward relative to the holding plate.

10. The cleaning tool as claimed in claim 9, wherein an opening is formed in a center portion of the intermediate window sheet, and a cleaning sheet passing space is formed between the intermediate window sheet and the holding plate.

11. The cleaning tool as claimed in claim 1, further comprising a shutter disposed in the cleaning window.

12. The cleaning tool as claimed in claim 11, wherein the shutter is operated by the lever to close the cleaning window when not in use.

13. The cleaning tool as claimed in claim 11, wherein an inner peripheral surface of the cleaning window includes guide grooves, and opposite edges of the shutter are slidably received in the guide grooves.

14. The cleaning tool as claimed in claim 1, wherein the winding pulley is integrally formed of plastic material, and includes a slit shaft and a disciform outer plate connected at one side to the slit shaft.

15. The cleaning tool as claimed in claim 1, wherein the case includes a feeding axis, formed integrally on the first side plate, for positioning the cleaning sheet in a predetermined position.

16. The cleaning tool as claimed in claim 15, wherein the cleaning sheet is provided on a feeding pulley which is rotatably mounted on the feeding axis, and a reverse rotation preventing arm is provided to prevent the feeding pulley from rotating in a reverse direction.

17. The cleaning tool as claimed in claim 16, wherein the feeding pulley includes a reverse rotation preventing gear that is engageable with an end of the reverse rotation preventing arm to prevent reverse rotation of the feeding pulley.

18. The cleaning tool as claimed in claim 1, wherein the rotation mechanism comprises a rack having a circular arc-shaped gear associated with the lever, a back-and-forth rotating plate having a pinion to engage the rack, and a ratchet apparatus for rotating the winding pulley in one direction by rotation of the back-and-forth rotating plate, wherein operation of the lever rotates the back-and-forth rotating plate via the rack, and the back-and-forth rotating plate rotates the winding pulley in one direction via the ratchet apparatus.

19. The cleaning tool as claimed in claim 18, wherein the rack is integrally formed of plastic with the lever.

20. The cleaning tool as claimed in claim 18, further comprising a round rib formed integrally with the first side plate, wherein:

the back-and-forth plate comprises a disc plate which is integrally formed of plastic with the pinion;

the disc plate includes a through hole located in a center thereof; and the round rib is inserted in the through hole to rotatably connect the back-and-forth rotating plate with the first side plate.

21. The cleaning tool as claimed in claim 20, further comprising a shutter provided in the cleaning window, wherein:

the back-and-forth rotating plate has a crankpin for opening and closing the shutter;

the shutter has a slit extending in a transverse direction relative to an opening direction and a closing direction of the shutter; and the crankpin is inserted in the silt to effect opening and closing of the shutter in response to rotation of the back-and-forth plate.

22. The cleaning tool as claimed in claim 18, wherein the rachet apparatus comprises:

a ratchet pulley;

an elastic rotating arm for rotating the ratchet pulley on one direction, wherein one end of the elastic rotating arm is connected to the back-and-forth rotating plate; and a stopper arm for preventing reverse rotation of the ratchet pulley.

23. The cleaning tool as claimed in claim 22, wherein the winding pulley is detachably connected to the ratchet pulley so that the winding pulley can be detached from the ratchet pulley to facilitate removal of the cleaning sheet from the winding pulley.

24. The cleaning tool as claimed in claim 22, wherein the ratchet pulley includes a disc, a spline shaft projecting from an upper surface of the disc for attaching to the winding pulley, and a ratchet ring having an inner ratchet gear and an outer ratchet gear.

25. The cleaning tool as claimed in claim 22, wherein the ratchet pulley comprises a ratchet ring having an inner ratchet gear and an outer ratchet gear, wherein an end of the elastic rotating arm engages the inner ratchet gear, and an end of the stopper arm engages the outer ratchet gear.

26. The cleaning tool as claimed in claim 25, wherein the end of the elastic rotating arm is curved along a direction of rotation of the inner ratchet gear.

27. The cleaning tool as claimed in claim 25, wherein the end of the stopper arm is curved along a direction of rotation of the ratchet pulley.

28. The cleaning tool as claimed in claim 1, further comprising an elastic member for biasing the lever in a direction so that the lever projects outwardly of the case when the lever is not operated.

29. The cleaning tool as claimed in claim 28, wherein the first side plate has a guiding groove, and the lever has a projection that projects into the guiding groove so that pivotal movement of the lever is limited by contact between the projection and opposite ends of the guiding groove.

* * * * *